(12) United States Patent
Frank et al.

(10) Patent No.: US 7,421,413 B2
(45) Date of Patent: Sep. 2, 2008

(54) DELICATE METERING OF COMPUTER USAGE

(75) Inventors: Alexander Frank, Bellevue, WA (US); Thomas G. Phillips, Bellevue, WA (US); George V. Reilly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 11/074,558

(22) Filed: Mar. 8, 2005

(65) Prior Publication Data

US 2006/0105739 A1    May 18, 2006

Related U.S. Application Data

(63) Continuation-in-part of application No. 11/006,837, filed on Dec. 8, 2004, which is a continuation-in-part of application No. 10/989,122, filed on Nov. 15, 2004.

(51) Int. Cl.
*G06F 17/00* (2006.01)
(52) U.S. Cl. .................................................. 705/418
(58) Field of Classification Search .................. 705/418
See application file for complete search history.

(56) References Cited

U.S. PATENT DOCUMENTS 5,768,382 A    6/1998    Schneier et al.

2001/0034711 A1*  10/2001  Tashenberg ............ 705/52
2003/0027549 A1*  2/2003  Kiel et al. .............. 455/405
2003/0135380 A1*  7/2003  Lehr et al. ............... 705/1

OTHER PUBLICATIONS

Goering, Richard, "Web Venture Offers Metered Access to EDA Packages—Startup Winds Clock on By-the-Hour Tools (e*ECAD Will Launch Web Site That Provides Pay-per-Use and Pay-per-Hour Access to Range of Chip Design Software)," Electronic Engineering Times, Nov. 6, 2000, p. 1.*
Specification of U.S. Appl. No. 10/989,907, filed Nov. 15, 2004.

* cited by examiner

*Primary Examiner*—John W Hayes
*Assistant Examiner*—Nathan Erb
(74) *Attorney, Agent, or Firm*—Marshall, Gerstein & Borun LLP

(57) ABSTRACT

A pay-per-use or metered-use computer uses a balance manager to monitor usage and update a value balance according to a first usage schedule when the computer is in active use. When the activity level of the computer is reduced below a threshold, the balance manager may update the value balance according to a second usage schedule. Activity level of the computer is determined by monitoring the activity level of a one or more components of the computer including input devices, communication controllers, and the processing unit. Rules can be applied to determine when to switch between usage schedules and if credits to the value balance should be made.

7 Claims, 5 Drawing Sheets

DELICATE METERING OF COMPUTER USAGE

This patent is a continuation-in-part of U.S. patent application Ser. No. 11/006,837, filed Dec. 8, 2004, which is a continuation-in-part of U.S. patent application Ser. No. 10/989,122, filed Nov. 15, 2004.

BACKGROUND

Pay-as-you-go or pay-per-use business models have been used in many areas of commerce, from cellular telephones to commercial laundromats. In developing a pay-as-you go business, a provider, for example, a cellular telephone provider, offers the use of hardware (a cellular telephone) at a lower-than-market cost in exchange for a commitment to remain a subscriber to their network. In this specific example, the customer receives a cellular phone for little or no money in exchange for signing a contract to become a subscriber for a given period of time. Over the course of the contract, the service provider recovers the cost of the hardware by charging the consumer for using the cellular phone.

The pay-as-you-go business model is built on metering usage. In the case of a cellular telephone provide the metered use is minutes or megabytes of data transported. In a pay-as-you-go business model for computers, where a service provider or underwriter subsidizes the cost of the hardware anticipating future revenue, there are many aspects of usage that can be monitored or metered. However, not all sources of metering data can be uniformly relied on. When data suggests the computer is in use, but is not, the subscriber may not get full value from his or her subscription. Conversely, when the computer is being used but not metered, the service provider does not receive fair compensation.

SUMMARY

The ability to accurately track usage, especially usage related to a metered contract, may be a significant part of a business model that allows subscribers to purchase and use a computer at a lower-than-market price in exchange for subscription payments. However, tracking computer usage can lead to some situations where ambiguity exists as to whether a metered condition exists or not. For example, a service provider selling time by minutes of processor usage may require periodic virus scans, which are programmed to run at midnight on Sundays. The hypothetical scan takes 1.5 hours. It is not clear that the subscriber should be charged for CPU usage when a required task is performed with no direct benefit to the subscriber. Similarly, the subscriber may be viewing a long document with almost no processor activity. Here, the subscriber has a direct benefit but according to strict processor activity, the computer may appear inactive. So called "delicate metering" uses a variety of inputs and business rules to reach a decision as to whether to meter the computer or not. A metering program may assess display state, communications, hard disk activity and even the programs being executed by the processor to determine whether usage should be accrued. Some activities may be sufficient by themselves, for example, mouse movement, to activate metering. Others, such as disk access, may need to be evaluated in light of other conditions, such as a virus checker running, before determining whether to meter the computer or not.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
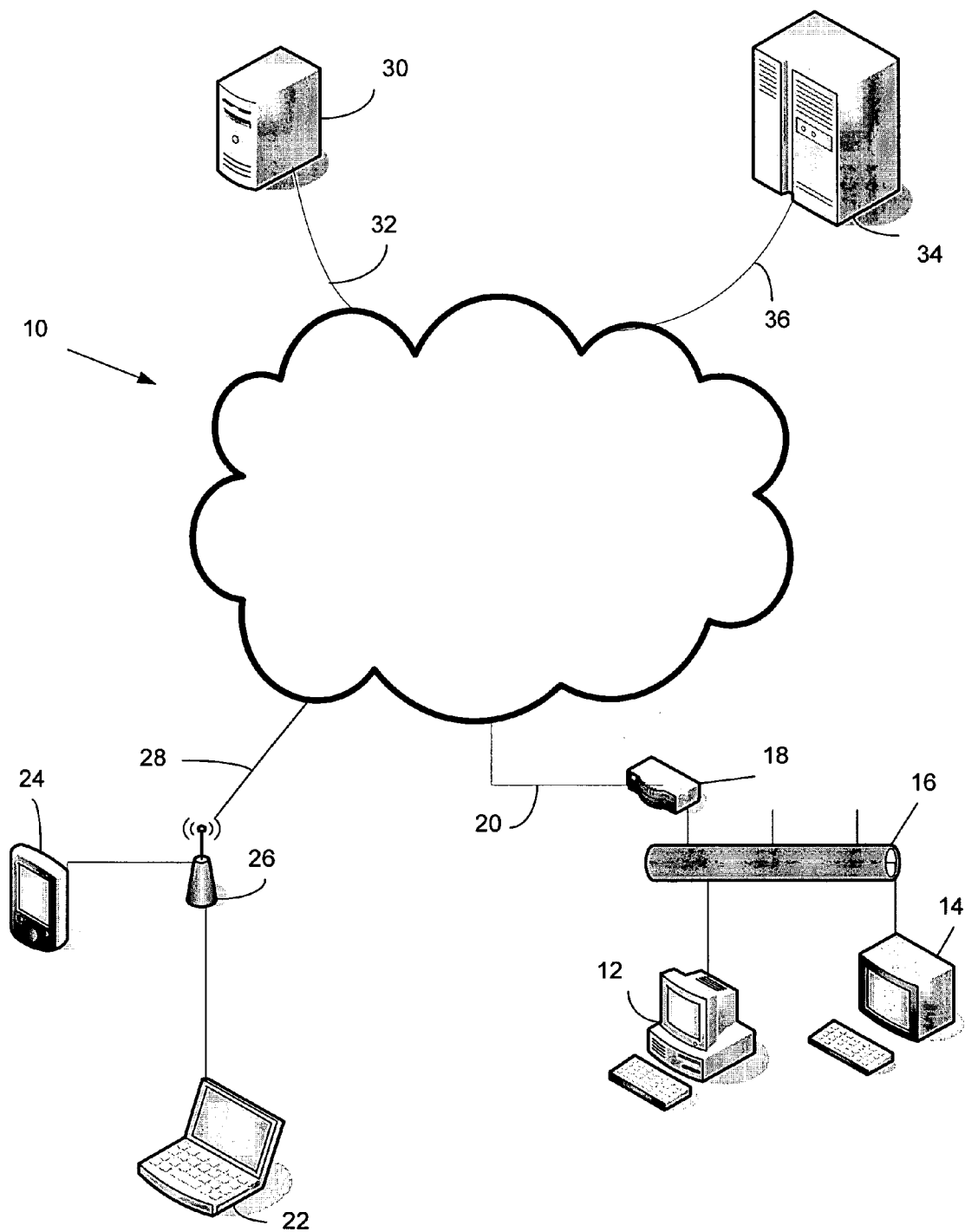
FIG. 1 is a simplified and representative block diagram of a computer network.

FIG. 1 illustrates a network 10 that may be used to implement a pay-per-use computer system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

Figure 2:
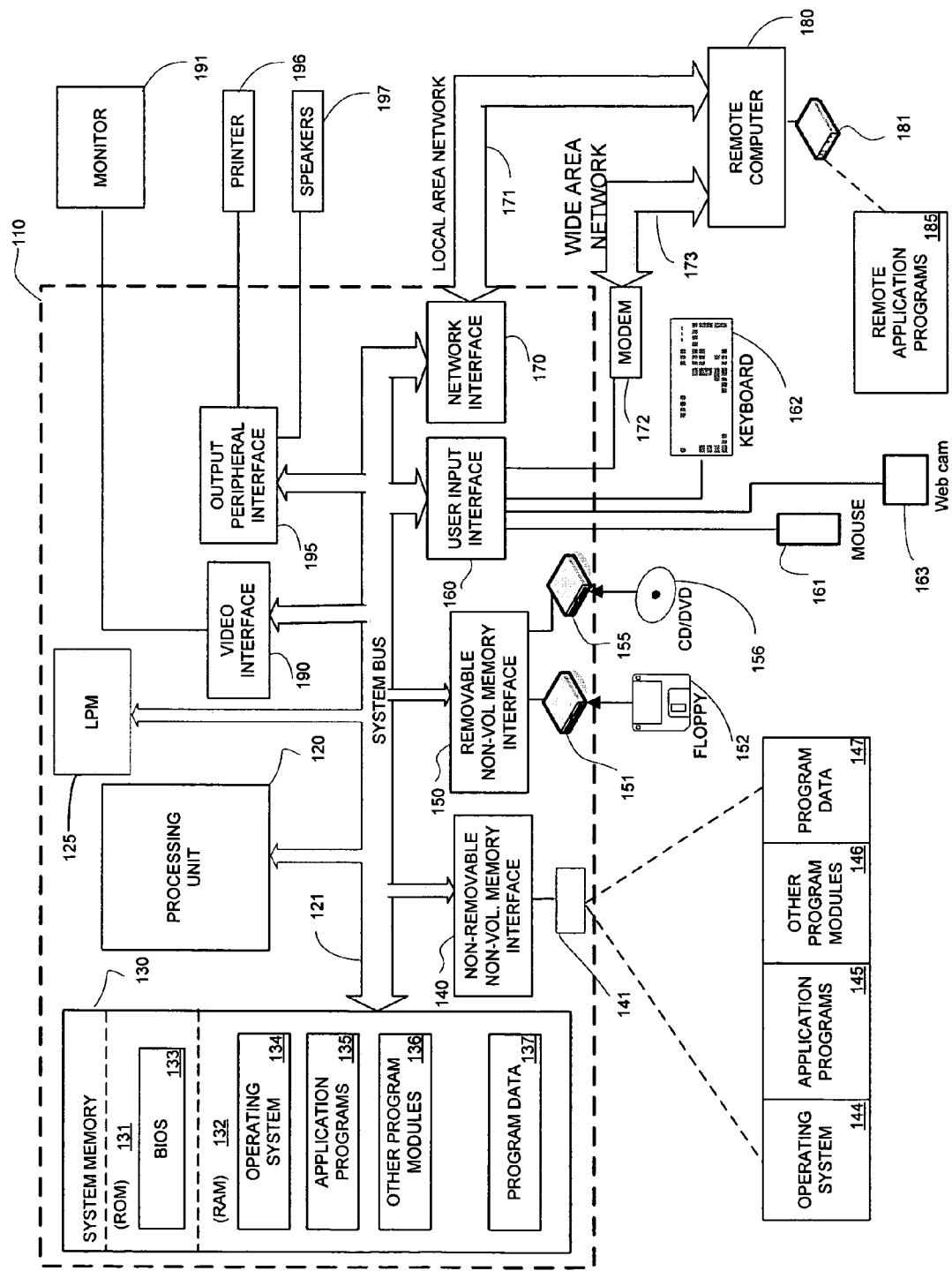
FIG. 2 is a block diagram of a computer that may be connected to the network of FIG. 1.

FIG. 2 illustrates a computing device in the form of a computer 110 that may be connected to the network 10 and used to implement one or more components of the dynamic software provisioning system. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a license provisioning module (LPM) 125. The LPM 125 is discussed in greater detail in FIG. 3. Briefly, the LPM 125 facilitates pay-as-you-go or pay-per-use operation of the computer 110. The LPM 125 manages metering usage, imposing sanctions when metered use is expired, and manages the request, receipt, and processing of data for replenishing the computer 110 for additional use.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Another input device may be a camera for sending images over the Internet, known as a web cam 163. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
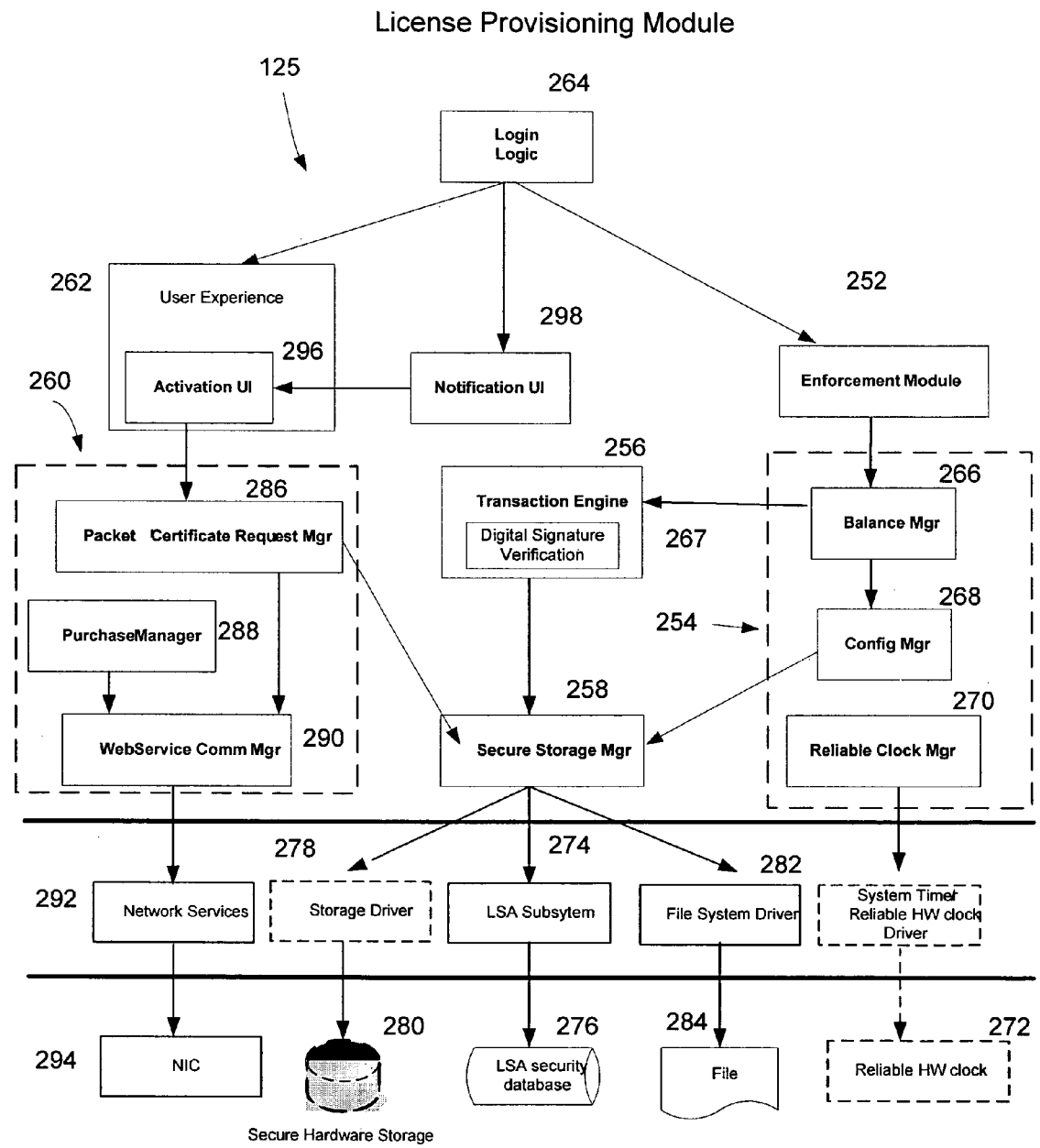
FIG. 3 is a block diagram of a license provisioning module of the computer of FIG. 2.

FIG. 3 illustrates a further detailed block diagram of the license provisioning module (LPM) 125. Specifically, the LPM 125 may include an enforcement add-on module 252 to enforce the computer 110 to operate in a particular state, a metering module 254 to meter usage of a resource provisioned on the computer 110, a transaction engine 256 to process provisioning packets received from a service provider (not depicted), a secure storage manager 258 to provide secure storage for the provisioning packets, a communication module 260 to communicate with the service provider, and a user experience module 262 to interact with a user.

The enforcement module 252 may be inserted into the login logic 264 of the computer 110. When a user logs onto the computer 110 using the login logic 264, or requests use of a chargeable provisioned resource, the enforcement module 252 may query the metering module 254 for balance information. If the enforcement module 252 determines that the computer 110 has enough value for the requested activity, it may allow the computer 110 to operate in its normal manner and allow the user to log onto the computer 110, or use the requested resource. However, if the enforcement module 252 determines that the computer 110 does not have enough value available, it may deny the login or access to the requested resource and may invoke a user interface to prompt the user to add value to the available balance.

To carry out the enforcement task, the enforcement module 252 may be able to disable or otherwise sanction resources under the direct influence or control of the computer 110. Sanctions related to external peripherals may be enforced by action on an appropriate controller, for example, input or output controllers 170 190 195, but in some cases, the sanction may need to be carried out at the peripheral itself.

The metering module 254 may include a balance manager 266 for reading and verifying a current balance available for usage of provisioned resource and for updating the current balance. The metering module 254 may also include a configuration manager 268 for determining valid system configuration information, such as authorized, i.e. chargeable, peripherals. The metering module 254 may also include a reliable clock manager 270 for maintaining an always increasing timer. The metering module 254 may provide the mechanism for monitoring how often, how much, or over what period the computer 110, or components thereof, are used. The metering module 254 may utilize hooks in the operating system to count application starts when usage is metered by application. Alternately, the metering module 254 may monitor the processing unit 120 cycles or usage to determine how much the computer 110 or an individual application has actually been in operation. In another alternate embodiment, the reliable clock manager 270 may be monitored to determine when a given period for authorized use has expired, for example, a calendar month or 30 days.

The reliable clock manager 270 may use a reliable hardware clock 272 to accomplish the task of maintaining the monotonically changing timer. The reliable clock manager 270 may be used to provide system time, or may be used to provide time service only for usage metering. The balance manager 266 and the reliable clock manager 270 may be very sensitive and important to the secure operation of the LPM 125, and therefore they are likely to be under various security attacks during the operation of the LPM 125.

The enforcement add-on module 252 and the metering module 254 may work together to implement activation and de-activation of the provisioned resource on the computer 110. The enforcement add-on module 252 may function as an event dispatcher that invokes the balance manager 266 based upon certain events, while the balance manager 266 may determine what action to take when it is invoked in response to an event. Examples of various events that may cause the enforcement add-on module 252 to invoke the balance manager 266 are (1) a logon event, (2) a system unlock event, (3) a restore from hibernation event, (4) a wake up from standby event, (5) a user triggered event, such as a request to use a peripheral (6) a logoff event, (7) a packet download, (8) a timer tick, etc. The balance manager 266 may accept the event as an input and return a result action to the enforcement add-on module 252.

The transaction engine 256 may process a provisioning packet in order to update a balance in the balance manager 266. The transaction engine 256 may ensure that any provisioning packet is consumed only once to update the balance. The transaction engine 256 may be designed so that it performs atomic update and reconciliation transactions, thus either both the balance and the resource provider accounts are updated or neither the balance and resource provider accounts are updated.

To process provisioning packets, the transaction engine 256 may include a digital signature verification circuit 267. The digital signature verification circuit 267 may have circuitry and/or software for decrypting the provisioning packet, whether the provisioning packet is received electronically over the Internet, locally from a local area network, from removable media, entered manually, or another method of transport. When using traditional public key infrastructure ("PKI") the message may be decrypted, if encrypted, and the hash may be generated and checked against the digital signature to validate the integrity and authenticity of the provisioning packet. The particular encryption algorithm employed, for example, RSA™ or elliptic curve, is not significant. Digital signature technology including sender verification and content verification is well known and not covered in detail here.

The secured storage manager 258 may allow the LPM 125 to store balance data in a secured manner so that it cannot be tampered with by a user and so that it is accessible only by the LPM 125. After a provisioning packet is downloaded by the LPM 125, it may be stored in the secured storage manager 258. Similarly, the balance counter and the packet consumption counter may also be stored in the secured storage manager 258. The secured storage manager 258 may also store data that is used in the set-up and operation of the local provisioning module 125. Additionally, software for determination of activity levels, the rules or algorithms associated with usage schedules, and their corresponding thresholds may be stored in the secured storage manager 258. In general, this is data that, if compromised, may be used to circumvent the controls for pay-per-use or pre-pay operation. Among such data may be a unique identifier, that may be a number or code that can be used to identify one computer 110 from another. The unique identifier may be used to prepare digitally signed provisioning packets that can only be used with a single machine. Provisioning packets may be data received that add value to the balance manager 266, new or updated usage schedules, or new rules and thresholds for activity evaluation.

Some of the data associated with the authentication of provisioning packets may be stored in the secure storage manager 258. For example, a transaction sequence number may be used to discourage or prevent replay attacks. In addition, a "no-earlier-than" date may be extracted from the provisioning packet and stored to discourage or prevent clock tampering attacks. In one embodiment, the no-earlier-than date may be the date/time that the provisioning packet was created. Because the use of the provisioning packet may not take place before the provisioning packet was created, neither may the clock of the computer 110 be set to a date or time prior to the latest date of the last provisioning packet, after accounting for time zones.

State data, stored by the secure memory manager 258, may be used to indicate whether the computer 110 is in a fully operational mode or if the computer 110 or an application is under some restriction or sanction. While most software may be stored or executed from general system memory 130 there may some executable code, for example, applications, routines, or drivers that are ideally tamper resistant. For example, a routine that sets the reliable hardware clock 272 may itself need to be protected to prevent tampering and fraud.

Metering or usage data created or used by the metering module 254 may need more protection than that offered by system memory 130 and may therefore be stored in the secure storage manager 258. Metering or usage data may include, for example, the number of usage units remaining, the maximum number allowable usage units, a list of metered applications, or a stop time/date. Closely related to metering or subscription data may be the subscription plans. To provide flexibility, users may be allowed to select from a number of subscription plans, as mentioned above. These subscription plans may include use by period, use for a number of hours, use by application using either number of activations or usage, use by input/output (network connectivity), as well as others including combinations of the above. Protection of the subscription plans may be important because it is not desirable for a user to be able to alter or create new plans that could result in fraudulent use. When a subscription plan calls for pay-per-use or metered-use, the appropriate business rules, if not present, may be securely downloaded and stored in the secure storage manager 258.

A certificate revocation list ("CRL") may be used to determine if the current root certificate is valid. When not retrieved real-time from a host, the CRL may be securely stored locally to prevent tampering that may allow fraudulent use by presenting a provisioning packet signed by a compromised or non-authorized private key. While the public keys of a root certificate are in the public domain and technically do not need protection, in the interest of the integrity of provisioning packet verification, the root certificate may be stored in the secure storage manager 258. In the illustrated implementation, the secured storage manager 258 is implemented as a dynamic link library (dll) so that the user experience module 262 can access the secured storage manager 258.

To ensure that the data stored in the secured storage manager 258 is secure, a data encryption key may be used to store the data in the secured storage manager 258 and only a module having the data encryption key is able to read the data from the secured storage manager 258. The secured storage manager 258 may communicate with a local security authority (LSA) subsystem 274 to communicate with an LSA database 276, a storage driver 278 to communicate with secure hardware storage 280, and a file system driver 282 to communicate with a file 284 on the computer 110. For added security, an alternate implementation of the secured storage manager 258 may also use multiple copies of the data stored in the secured storage manager 258 so that each copy can be cross-referenced to ensure that there is no tampering with any single copy of the data. While the implementation of the LPM 125 discussed here has the secured storage manager 258 implemented in software, in an alternate implementation, the secured storage manager 258 may be implemented in hardware.

The communication module 260 may include a packet/certificate request manager 286 to request provisioning packets and/or certificates or to purchase additional provisioning packets from the service provider, and a web service communication manager 290 that allows the LPM 125 to communicate with the network 10.

The packet/certificate request manager 286 may receive a request to download a packet or a certificate. The packet/certificate request manager 286 may also be responsible to acknowledge to the service provider (not depicted) upon successful download of a certificate or a provisioning packet. The packet/certificate request manager 286 may use a provisioning protocol for communication. A packet downloaded by the packet/certificate request manager 286 may be stored in the secured storage manager 258.

The purchase manager 288 may allow a user of the computer 110 to add value to the local balance by purchasing provisioning packets by receiving payment information from the user and communicating the payment information to the service provider or a funding account (not depicted). For example, the purchase of a scratch card at a local outlet can be used to add value to the funding account that is then used to create a provisioning packet that is downloaded, verified and used to update the balance. Both the packet/certificate request manager 286 and the purchase manager 288 may communicate with the network 10 using the web service communication manager 290. The web service communication manager may use a network services manager 292 and a network interface card (NIC) 294 to communicate with the network 10. Note that in one implementation, the web service communication manager 290 is used to communicate with the network 10, in another implementation, other communication tools, such as file transfer protocol (FTP), etc., may be used to communicate with the network 10.

The user experience module 262 may include an activation user interface (UI) 296 to ask a user to enter an InitKey that allows the packet/certificate request manager 286 to download the certificate from the service provider (not depicted), and a notification UI 298 that allows the LPM 125 to interact with the user. The activation UI 296 may also invoke the purchase manager 288 to allow a user to purchase additional provisioning packets for balance recharging.

The notification UI 298 may include various user interfaces that allow the user to query current balance information, usage history, etc. The notification UI 298 may be invoked by the user or by the login logic 264. In a situation where the balance available for using a provisioned resource is low, the login logic 264 may invoke the notification UI 298 to inform the user that an additional purchase may be necessary. The notification UI may be constantly active and it may provide notification service to the user via a taskbar icon, a control panel applet, a balloon pop-up, or by using any other commonly known UI method.

In operation, the computer 110 measures pay-per-use or other metered use by any of several mechanisms, for example, elapsed usage time, calendar time, application starts, etc. Perhaps the easiest to measure, at least on the surface, may be simple time of operation. For example, 10 hours of pre-paid use may be purchased and provisioned in the balance manager 266. The time of use may be measured and subtracted from the total accumulated balance. When the 10 hours of use is consumed, the enforcement module 252 may cause the computer 110 to cease operation, or enforce another sanction as discussed above.

When tracking and recording any metric for determining pay-per-use, the accuracy of the measurement may be a major point of customer satisfaction. If the measurement favors the service provider, customers may become disgruntled and open to competitive offerings. On the other hand, if the measurement favors the customer, the service provider may not realize its financial goals.

As discussed above, the use of the most obvious techniques, particularly for measuring time, may be subject to errors due to interpretation of the conditions monitored. To help ensure fair metering that attempts to accurately meter computer usage, particularly time, a number of criteria may be analyzed to determine whether usage should be measured or not.

Figure 4:
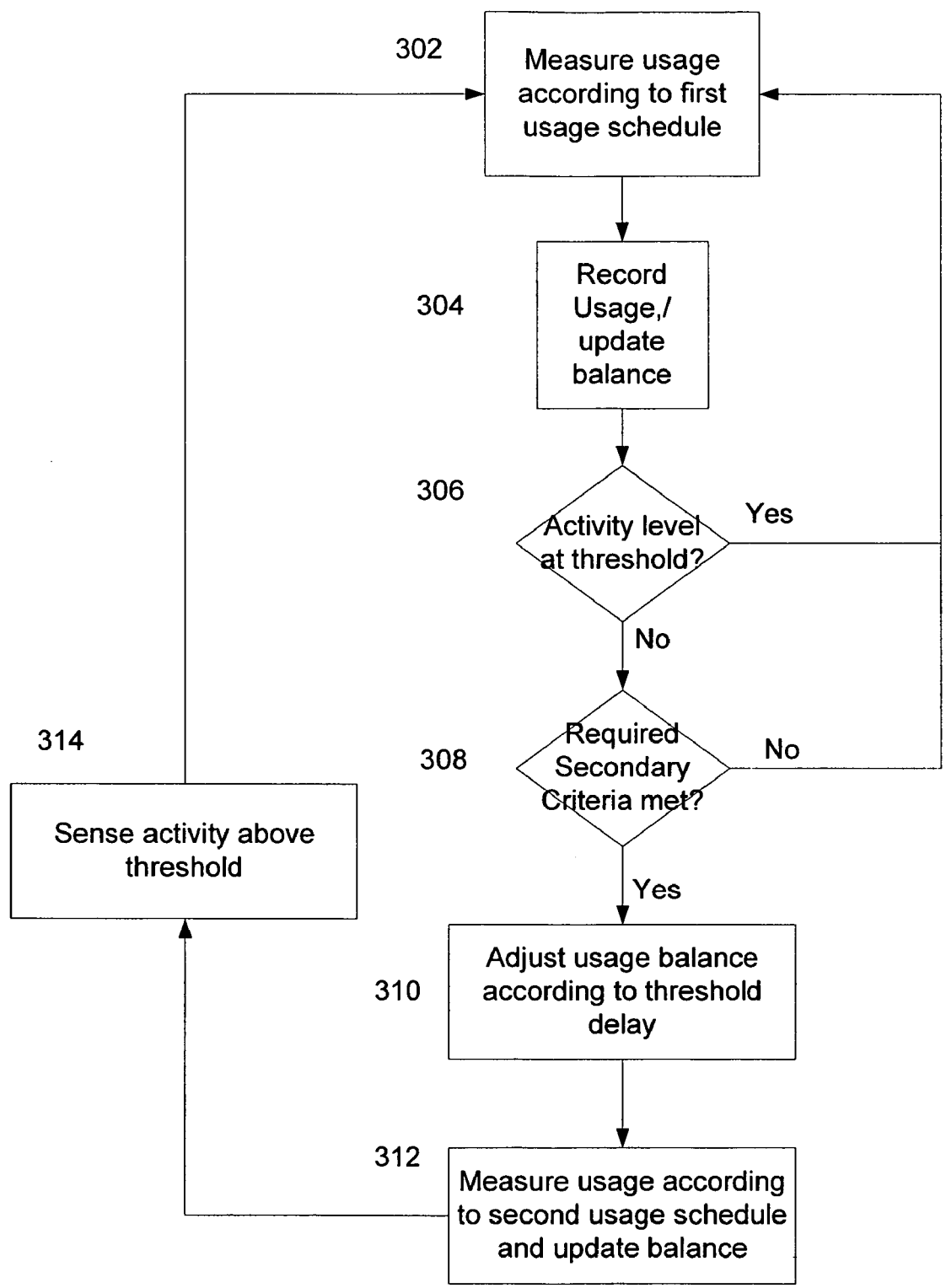
FIG. 4 is a flow chart depicting a method of metering usage of the computer of FIG. 2.

FIG. 4 is a flow chart depicting a method of metering usage of the computer 110. The computer 110 or more specifically, the balance manager 266, may measure 302 usage of the computer according to a first usage schedule. The usage schedule may be equal to straight usage, for example, one minute of paid time is deducted for each minute of measured use. Alternatively, the usage schedule may convert between currency and time, such as one cent per minute. The first usage schedule may represent multiple rates and special terms, for example, in yet another embodiment the usage schedule may accommodate discounts, e.g. one cent per minute for the first 60 minutes and 0.5 cents per minute after the first 60 minutes. As may be obvious, other operations are associated with measuring 302 usage. For example, as measurements are taken, comparisons to allowed usage may be made and warnings or sanctions related to the consumption of pre-paid use may be carried out in parallel with the steps outlined herein. Such activities are discussed at length in related application Ser. No. 11/006,837, referenced above, and are not discussed herein to allow a clear description of the present concepts.

Usage may be recorded 304 as well as related information that may be useful in recovering data during an unexpected interruption in service, such as power outage. Such related information may include the time between measurements. Activity level may also be monitored 306. If activity level is above a threshold, the yes branch may be taken and usage measurement continued at block 302. Monitoring the activity level may include monitoring the state of more than one component in the computer 110 to attempt to gain a more complete picture of the overall state of the computer 100. The activity level of the computer 110 may correspond the activity level of one or a combination of devices such as an input device 161 162, a printer 196, a web camera 163, a hard disk drive 141, a communications device 170 172, and a processing unit 120. Each component may have separate levels of activity, or individual thresholds that contribute to an overall threshold level, for use in the final metering decision. For the sake of illustration, input from a mouse 161 may always be interpreted as activity above a usage threshold. When activity from a set of primary devices, such as input devices 161 162, is sensed below a threshold of activity the no branch from block 306 may be taken. Activity may be further evaluated 308 to determine if secondary activity indicates the overall activity is below the threshold. In the simplest case, all the monitored activity levels must be below their respective thresholds for the balance manager 266 to cease deductions from the usage balance. However, the rules for this determination may be more complex, as illustrated below.

When performing the further evaluation at block 308, the activity level of another component, such as the processing unit 120, may be above the typical threshold, but if the bulk of its activity is attributed to a known background process, such as a screen saver, a virus checker, a software update process, housekeeping utilities, etc., the rules may cause the yes branch at block 308 to be taken. Ultimately then, the balance manager 266 may meter according to a second usage schedule. That is, the balance manager 266 may deduct from the usage balance at a second rate, for example, 10% of the first rate or the balance manager 266 could stop deducting from the usage balance altogether. The actual usage schedule in use at any given moment may be selected any of a number of usage schedules according to various rules and/or contractual stipulations.

In contrast, after other indicators of inactivity are observed at block 306, the activity level of another component, for example again, the processing unit 120, may be below the threshold for activity, but an analysis of the processing unit 120 activity at block 308 shows an image capture program is running that is periodically processing pictures from a camera and posting them to a web site. Operating a web-cam may be an example of a low activity use of the computer that, perhaps by contract, is counted as active use and therefore the no branch from block 308 may be taken and the balance manager 266 may continue to deduct from the usage balance even though no user may be physically using the computer 110. Alternately, the rules may allow web-cam usage to be metered according to a second or third usage schedule, in this example, lower than the rate of the first usage schedule but above not deducting at all. It is apparent that multiple usage schedules and corresponding metering rates may be developed based on the rules and analysis of usage activity.

Figure 5:
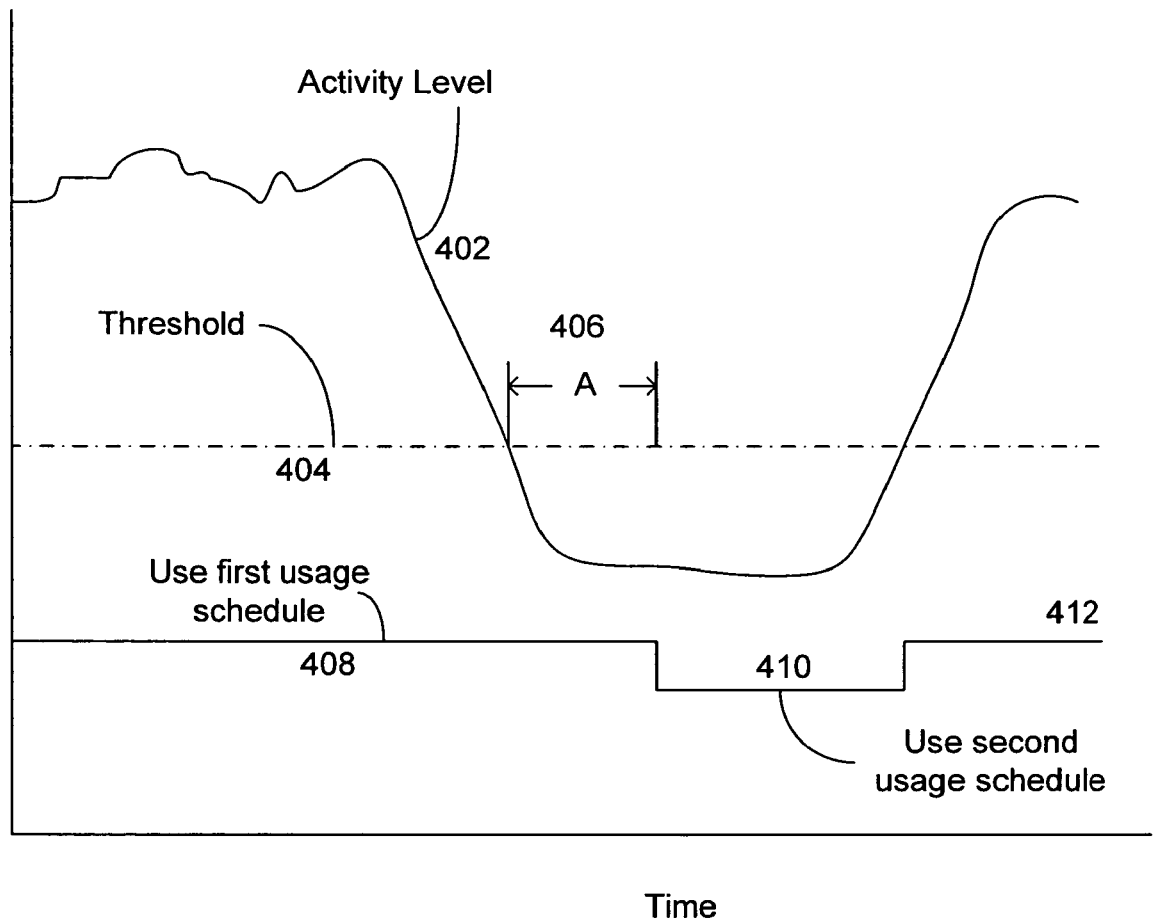
FIG. 5 is a graph depicting a usage profile of the computer of FIG. 2.

Referring briefly to FIG. 5, a graph depicting an activity profile illustrates analysis of the activity level of the computer 110. An exemplary profile 402 of overall activity level of the computer 110 vs. time shows activity level falling below a threshold level 404 for a period of time and then rising again above the activity threshold. In this example, the rules require that the activity level remain below the threshold for a period of time "A" 406 before the usage switches from metering using the first usage schedule, as depicted by graph segment 408, before switching to the second usage schedule, depicted by graph segment 410. The delay may allow determination that the user has left the computer 110 rather than being present and reading a page of text. The duration of the period "A" 406 may be used by the balance manager 266 to adjust the usage balance after switching to the second usage schedule. The delay period "A" 406 may be credited to the user's usage balance. Thereby, the user is given credit for the time utilized to satisfy inactivity requirements before switching to the second usage schedule. Under other circumstances the balance manager 266 may subtract or debit the usage balance, for example, when a lag occurs when transitioning from non-metered to metered rates. The balance manager 266 may return to metering according to the first usage schedule when the activity level returns above the threshold 404, as depicted by graph segment 412. Some hysteresis may be built into the rules so that the threshold level may vary according to the direction (more-to-less or less-to-more) of activity level.

The usage profile of FIG. 5 may be representative of the overall activity level of the computer. Similarly, as discussed above, the usage profile of FIG. 5 may represent one of many usage profiles. For example, usage profiles may be maintained for a hard disk drive 141, a communications device 170 172, or the processing unit 120, to name a few component-level devices. To make even finer grain evaluations, usage profiles may be made at the subcomponent level, for example, a range of system memory 132 or a sector of hard disk drive 141 storage. The usage profiles may be evaluated singly, as discussed above, or may use a straight or weighted sum to arrive at an overall decision regarding metering. In another example, the length of time a component or resource must be idle may be varied, e.g. period "A" 406 may be shorter or longer depending on the component. At the same time, the vertical axis of the usage profile represent a simple two-value on/off scale, or may have a discrete measurement values such as percent change per unit time, for example, percent change of contents of a range of memory, such as memory 132, Returning to FIG. 4, as discussed above, the balance manager 266 may adjust 310 the balance according to any delay that may be imposed by the rules for determining the activity level. When all the criteria have been met, the balance manager 266 may then measure usage 312 according to the second usage schedule, that is, deduct value from the balance at a different rate, or not at all. When an event occurs 314 that moves the activity level above the threshold again, measurement may be returned to the rate according to the first usage schedule at block 302.

Described above are several specific embodiments including hardware and software embodiments for delicate metering of computer usage. A more fair and accurate method of determining and measuring beneficial usage is disclosed by monitoring and evaluating activity levels of one or more components of the computer 110 and applying appropriate business rules. This benefits a broad range of home, office and enterprise pay-per-use or metered-use applications. However, one of ordinary skill in the art will appreciate that various modifications and changes can be made to these embodiments, including but not limited to the use of different combinations of hardware or software for activity monitoring, multiple rate schedules, as well as more or less complex rules associated with determining an appropriate usage schedule. Accordingly, the specification and drawings are to be regarded in an illustrative rather than restrictive sense, and all such modifications are intended to be included within the scope of the present patent.

The invention claimed is:

1. A computer system adapted for self contained metering of usage comprising:
a memory for storing data and program code; and a processor coupled to the memory wherein the processor executes a metering program without reliance on a network connection for sensing an activity level of the computer system, said metering program executing the steps comprising:
measuring the activity level of the computer system for at least one point in time;
comparing the activity level at each point in time to a predetermined activity threshold;
storing for at least one point in time an indication of whether the activity level of the computer system is above or below the predetermined activity threshold at that point in time;
measuring the activity level of the computer system at a particular later point in time;
comparing the activity level at the particular later point in time to the predetermined activity threshold;
if the activity level at the particular later point in time is above the predetermined activity threshold, subtracting value from a local value balance stored on the computer system at a first rate; and
if the activity level at the particular later point in time is below the predetermined activity threshold, performing the following steps:
(a) accessing from storage for at least one point in time an indication of whether the activity level of the computer system was above or below the predetermined activity threshold at that point in time;
(b) based on said accessed one or more indications, determining a length of time that the activity level of the computer system has been below the predetermined activity threshold;
(c) comparing the length of time to a predetermined length-of-time threshold;
(d) storing an indication of whether the length of time is greater than or less than the predetermined length-of-time threshold;
(e) if the length of time is less than the predetermined length-of-time threshold, subtracting value from the local value balance stored on the computer system at the first rate; and
(f) if the length of time is greater than the predetermined length-of-time threshold, performing the following steps:
(i) subtracting value from the local value balance stored on the computer system at a second rate;
(ii) accessing from storage an indication of whether the most recent previously determined length of time was greater than or less than the predetermined length-of-time threshold;
(iii) if the most recent previously determined length of time was less than the predetermined length-of-time threshold, then adding a credit to the local value balance stored on the computer system equal to any additional amount that the local value balance stored on the computer system was decreased due to being decreased during the length of time at the first rate instead of the second rate; and
(iv) if the most recent previously determined length of time was greater than the predetermined length-of-time threshold, then refraining from adding a credit to the local value balance stored on the computer system.

2. The computer system of claim 1, wherein the metering program determines the activity level of the computer system to be above the predetermined activity threshold whenever any activity of an input device is sensed.

3. The computer system of claim 1, wherein the metering program evaluates the activity level of the computer system corresponding to a processor activity level attributed to a background process being at least one of a utility, a screen saver, a virus checker, an update, and the metering program.

4. A method of metering of computer usage, comprising:
measuring an activity level of a component of a computer for at least one point in time;
comparing the activity level at each point in time to a predetermined activity threshold;
storing for at least one point in time an indication of whether the activity level of the component of the computer is above or below the predetermined activity threshold at that point in time;

measuring the activity level of the component of the computer at a particular later point in time;

comparing the activity level at the particular later point in time to the predetermined activity threshold;

if the activity level at the particular later point in time is above the predetermined activity threshold, subtracting value from a local value balance stored on the computer; and if the activity level at the particular later point in time is below the predetermined activity threshold, performing the following steps:

(a) accessing from storage for at least one point in time an indication of whether the activity level of the component of the computer was above or below the predetermined activity threshold at that point in time;

(b) based on said accessed one or more indications, determining a length of time that the activity level of the component of the computer has been below the predetermined activity threshold;

(c) comparing the length of time to a first predetermined length-of-time threshold;

(d) storing an indication of whether the length of time is greater than or less than the first predetermined length-of-time threshold;

(e) if the length of time is less than the first predetermined length-of-time threshold, subtracting value from the local value balance stored on the computer; and (f) if the length of time is greater than the first predetermined length-of-time threshold, performing the following steps:

(i) ceasing subtracting value from the local value balance stored on the computer;

(ii) accessing from storage an indication of whether the most recent previously determined length of time was greater than or less than the first predetermined length-of-time threshold;

(iii) if the most recent previously determined length of time was less than the first predetermined length-of-time threshold, then adding a credit to the local value balance stored on the computer equal to the amount that the local value balance stored on the computer was decreased due to being decreased during the length of time; and (iv) if the most recent previously determined length of time was greater than the first predetermined length-of-time threshold, then refraining from adding a credit to the local value balance stored on the computer.

5. The method of claim 4, wherein measuring the activity level of the component of the computer comprises measuring the activity level of at least one of an input device, a printer, a web camera, a storage device, a communications device and a processor.

6. The method of claim 4, wherein measuring the activity level of the component of the computer comprises measuring the execution of at least one of a screen saver, a virus checker, a utility, and an update.

7. The method of claim 4, wherein subtracting value from the local value balance only begins when the activity level of the component of the computer has exceeded the predetermined activity threshold for a period of time greater than a second predetermined length-of-time threshold.

\* \* \* \* \*